US010816877B1

(12) United States Patent
Viglione et al.

(10) Patent No.: US 10,816,877 B1
(45) Date of Patent: Oct. 27, 2020

(54) SHUTTER ASSEMBLY WITH LINEAR DRIVE

(71) Applicant: Vincent Associates, Rochester, NY (US)

(72) Inventors: David Viglione, Rochester, NY (US); Mark Watson, Rochester, NY (US); Stephen T. Pasquarella, Rochester, NY (US); Adam Lamb, Rochester, NY (US)

(73) Assignee: Vincent Associates, Rochester, NY (US)

( * ) Notice: Subject to any disclaimer, the term of this patent is extended or adjusted under 35 U.S.C. 154(b) by 0 days.

(21) Appl. No.: 16/434,636

(22) Filed: Jun. 7, 2019

Related U.S. Application Data

(60) Provisional application No. 62/682,422, filed on Jun. 8, 2018.

(51) Int. Cl.
*G03B 9/14* (2006.01)
*H04N 5/225* (2006.01)

(52) U.S. Cl.
CPC ............ *G03B 9/14* (2013.01); *H04N 5/2254* (2013.01)

(58) Field of Classification Search
None
See application file for complete search history.

(56) References Cited

U.S. PATENT DOCUMENTS 3,918,077 A * 11/1975 Burton .................... G03B 9/36 396/463
4,408,859 A * 10/1983 Fukahori .................. G03B 9/08 396/246
4,727,389 A * 2/1988 Raschke .................. G03B 3/10 396/103
4,763,155 A * 8/1988 Oda ......................... G03B 7/10 396/235
4,897,681 A * 1/1990 Yamamoto ............... G03B 9/26 396/508
5,325,148 A * 6/1994 Katagiri ................. G03B 7/093 396/246
5,502,525 A * 3/1996 Mizoguchi ............... G03B 9/02 348/366
5,594,519 A * 1/1997 Shimizu ................... G03B 9/22 396/449
5,715,003 A * 2/1998 Kanno ..................... G03B 9/42 348/341
5,729,783 A * 3/1998 Depatie ................... G03B 9/02 396/227
2011/0158635 A1* 6/2011 Hwang .................... G03B 9/14 396/463

(Continued)

*Primary Examiner* — William B Perkey
(74) *Attorney, Agent, or Firm* — Lee & Hayes, P.C.

(57) ABSTRACT

A shutter assembly includes a base plate defining a shutter opening having a central axis, and a drive assembly coupled to the base plate. The drive assembly includes a rotatable pinion gear, and a drive rack mating with the pinion gear and moveable in a substantially linear direction in response to rotation of the pinion gear. The shutter assembly also includes a plurality of shutter blades operably connected to the drive rack. The plurality of shutter blades are configured to rotate between an open position exposing the shutter opening and a closed position substantially occluding the shutter opening in response to movement of the drive rack in the substantially linear direction.

20 Claims, 9 Drawing Sheets

12 40 20 38 30 CONTROLLER 82 88 16 14 POWER SOURCE 84 10 18

(56) References Cited

U.S. PATENT DOCUMENTS

| | | | | |
|---|---|---|---|---|
| 2013/0258176 | A1* | 10/2013 | Jang | G03B 9/14<br>348/367 |
| 2014/0226964 | A1* | 8/2014 | Shintani | G03B 9/42<br>396/453 |

* cited by examiner 10
12
14
15
16
16a
16b
16c
16d
18
20
22
24
26
28
30
32
34
36
38
41
42
44
45
46
48
50a
50b
50c
50d
52a
52b
54
56a
56b
56c
56d
72
74
76
78
80
81
86
90a
90b

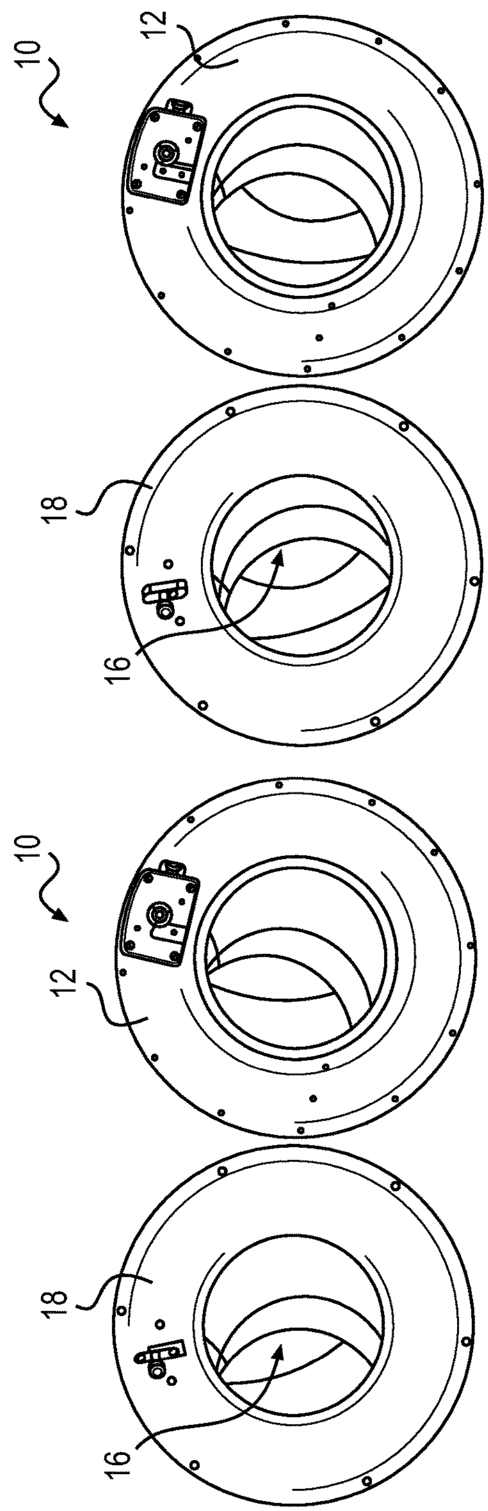
CLOSED
FIG. 5
25% OPEN
FIG. 6
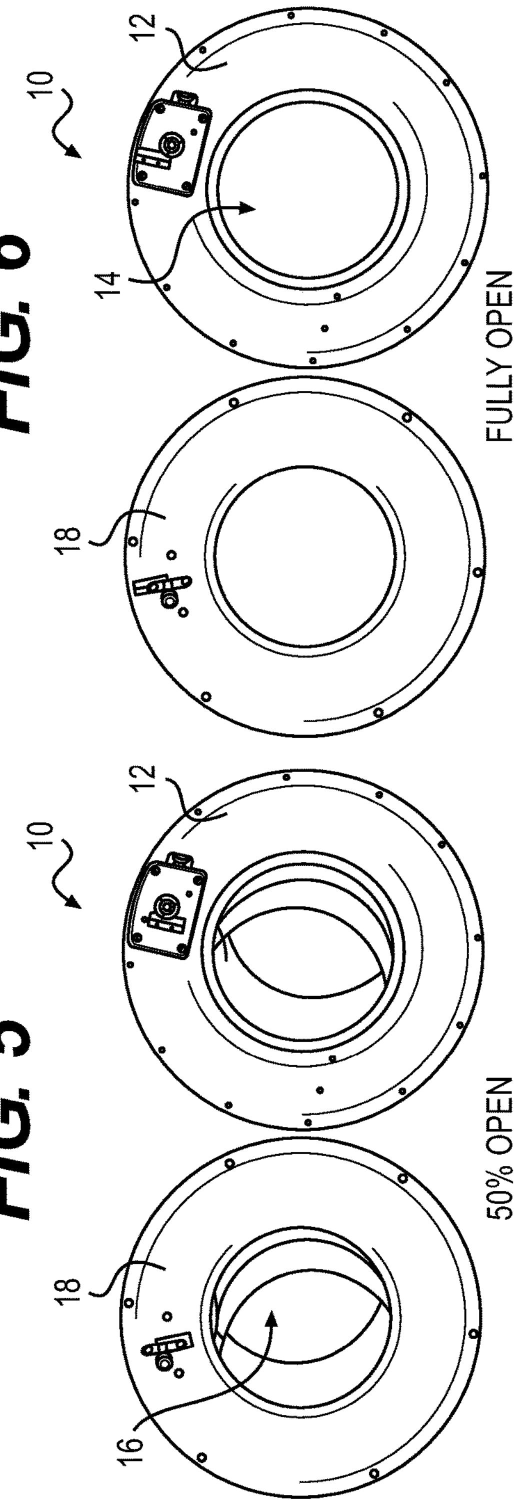
50% OPEN
FIG. 7
FULLY OPEN
FIG. 8

10

SHUTTER ASSEMBLY WITH LINEAR DRIVE

CROSS-REFERENCE TO RELATED APPLICATIONS

The present disclosure is a nonprovisional application of and claims priority to U.S. Provisional Patent Application No. 62/682,422, filed Jun. 8, 2018, which is incorporated herein by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

Field of the Invention

The present disclosure relates generally to shutter assemblies and, more particularly, to shutter assemblies relying on substantially linear drive forces to open and/or close a plurality of shutter blades.

Description of Related Art

Electromagnetic shutter assemblies are commonly used in photographic and other applications requiring a relatively rapid shutter exposure pulse. Such shutter assemblies typically employ a number of shutter blades that are movable to expose a shutter opening (e.g., an aperture) of the assembly. For example, such shutter blades can be movable between an open position exposing the shutter opening, and a closed position substantially occluding the shutter opening. In the open position, light may be allowed to pass through the shutter opening to reach a lens and/or film utilized with a corresponding photographic device, such as a camera. Once a desired exposure time has elapsed, the shutter blades may then be moved to the closed position, thereby blocking light from passing through the shutter opening.

Such shutter blades are typically coupled to one or more drive components configured to rapidly and controllably transition the blades between the open and closed positions. Such components may include, for example, a drive ring or other such structure rotatably engaging, for example, a base plate of the shutter assembly. In such a configuration, the shutter blades may be movably coupled to both the drive ring and the base plate, and the drive ring may be rotatable in response to activation of one or more associated actuators. For example, drive forces applied by the drive ring in the clockwise or counterclockwise directions may cause each of the shutter blades to move between the open and closed positions, thereby exposing or substantially occluding the shutter opening.

Known shutter assemblies, however, may suffer from several undesirable deficiencies. For example, due to the large number of tightly-toleranced components required for proper functionality, such shutter assemblies can be difficult to manufacture and/or repair. Additionally, the drive ring and other required components associated with moving the shutter blades between the open and closed positions described above may increase the weight, size, and cost of such shutter assemblies, and may result in reduced reliability. Further, in applications in which a relatively large shutter opening is required, it can be difficult to utilize known shutter blade and/or drive ring configurations due at least in part to the corresponding increase in size of the base plate, and of other shutter assembly components, necessitated by such configurations.

The example embodiments of the present disclosure are aimed at addressing one or more of the deficiencies discussed above.

BRIEF SUMMARY OF THE INVENTION

In an example embodiment of the present disclosure, a shutter assembly includes a base plate defining a shutter opening having a central axis, and a drive assembly coupled to the base plate. The drive assembly includes a rotatable pinion gear, and a drive rack mating with the pinion gear and moveable in a substantially linear direction in response to rotation of the pinion gear. The shutter assembly also includes a plurality of shutter blades operably connected to the drive rack. The plurality of shutter blades are configured to rotate between an open position exposing the shutter opening and a closed position substantially occluding the shutter opening in response to movement of the drive rack in the substantially linear direction.

In such an example embodiment, the shutter assembly may include a first pin extending from the base plate, and a second pin extending from the base plate. The plurality of shutter blades may include a first pair of shutter blades rotatable about the first pin, and a second pair of shutter blades rotatable about the second pin. In some examples, movement of the drive rack in the substantially linear direction drives rotation of the first pair of shutter blades in a first direction about the first pin, and drives rotation of the second pair of shutter blades in a second direction, opposite the first direction, about the second pin. Additionally, in some examples the first pair of shutter blades comprises a first shutter blade and a second shutter blade, and movement of the drive rack in the substantially linear direction drives rotation of the first shutter blade at a first speed, and rotation of the second shutter blade, simultaneous with rotation of the first shutter blade, at a second speed different from the first speed.

In still further examples, each shutter blade of the plurality of shutter blades includes a respective slot, and the drive rack includes a pin extending at least partly through the respective slot of each shutter blade.

In additional examples, the shutter assembly further includes a substantially planar guide plate disposed opposite the base plate. In such examples, the plurality of shutter blades includes a first shutter blade slidably engaging a first surface of the guide plate as the plurality of shutter blades rotates between the open position and the closed position, and a second shutter blade slidably engaging a second surface of the guide plate, opposite the first surface, as the plurality of shutter blades rotates between the open position and the closed position. In such examples, the plurality of shutter blades further includes a third shutter blade disposed between the first shutter blade and the base plate, the third shutter blade slidably engaging an inner surface of the base plate, opposite and facing the first surface of the guide plate, as the plurality of shutter blades rotates between the open position and the closed position. Additionally, in such examples the plurality of shutter blades further includes a fourth shutter blade disposed between the second shutter blade and a cover of the shutter assembly, the fourth shutter blade slidably engaging an inner surface of the cover, opposite and facing the second surface of the guide plate, as the plurality of shutter blades rotates between the open position and the closed position. Further, in one or more such examples the drive rack includes a pin extending through a slot formed by the guide plate, the pin engaging each shutter blade of the plurality of shutter blades.

In still further example embodiments, at least part of the drive rack is slidably disposed within a channel formed by the base plate. In such examples, the shutter assembly further includes a retention plate connected to the base plate, and the drive rack is disposed between the base plate and the retention plate.

BRIEF DESCRIPTION OF THE SEVERAL VIEWS OF THE DRAWINGS

FIGS. 5-8 illustrate top and bottom plan views of the shutter shown in FIGS. 1 and 2 as the shutter blades transition from a closed position (FIG. 5) to an open position (FIG. 8).

DETAILED DESCRIPTION OF THE INVENTION

Figure 1:
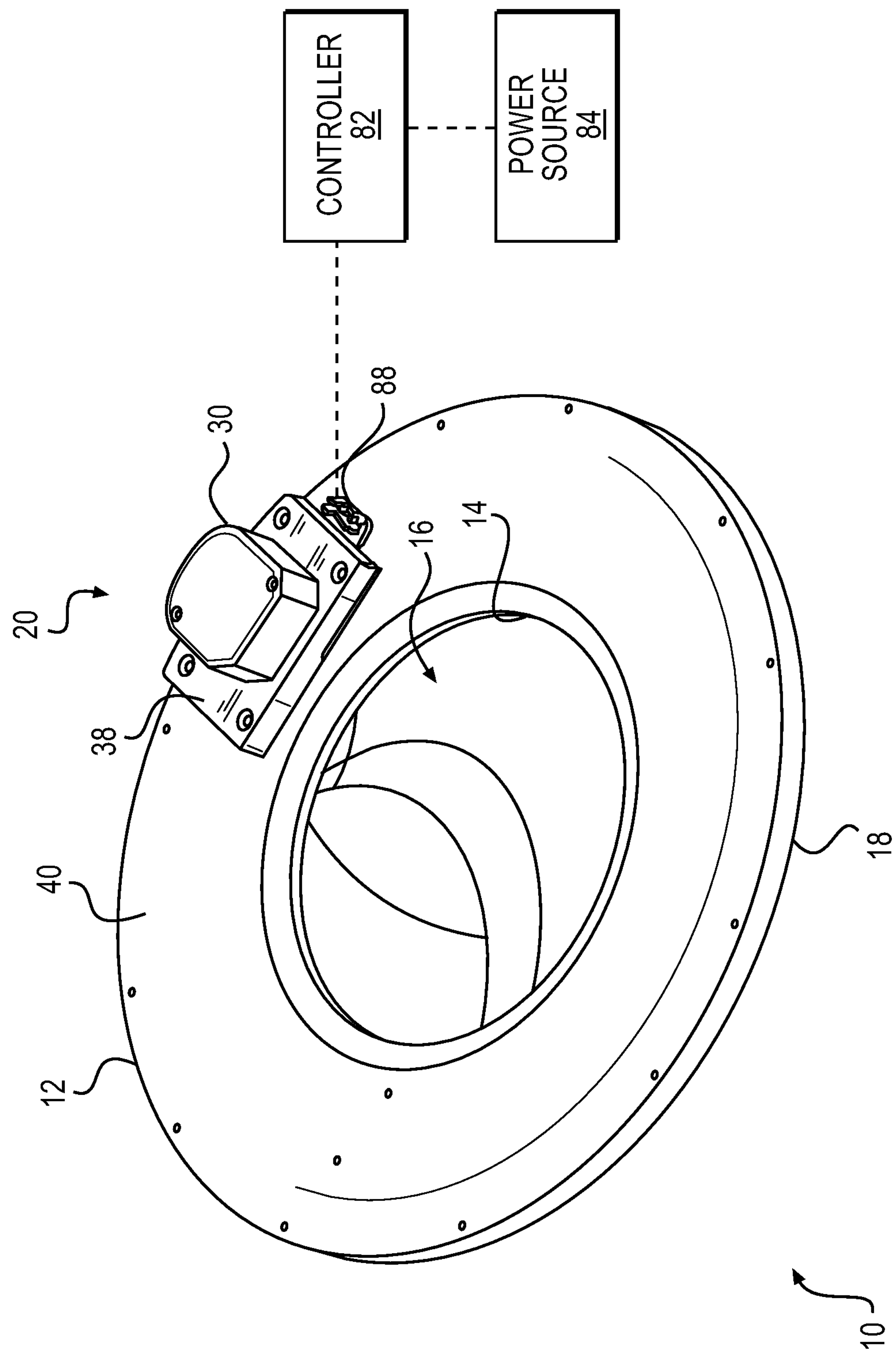
FIG. 1 illustrates a top isometric view of a shutter according to an example embodiment of the present disclosure.
Figure 2:
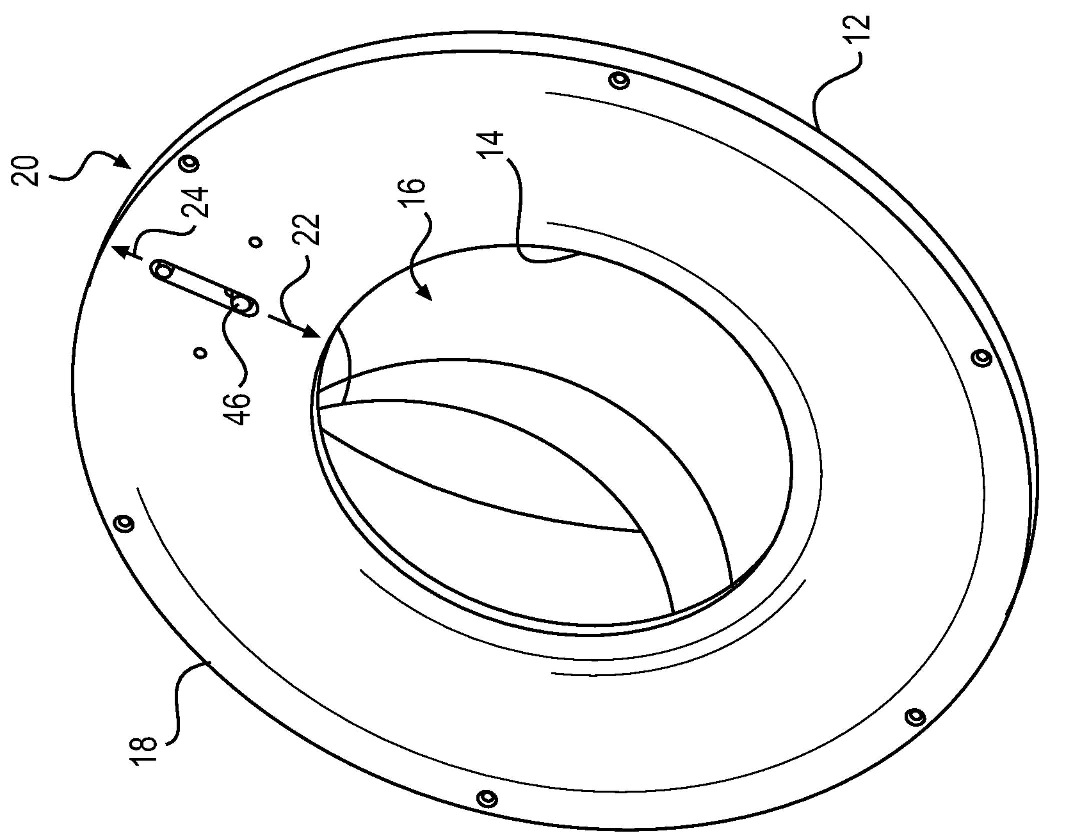
FIG. 2 illustrates a bottom isometric view of the shutter shown in FIG. 1.
Figure 3:
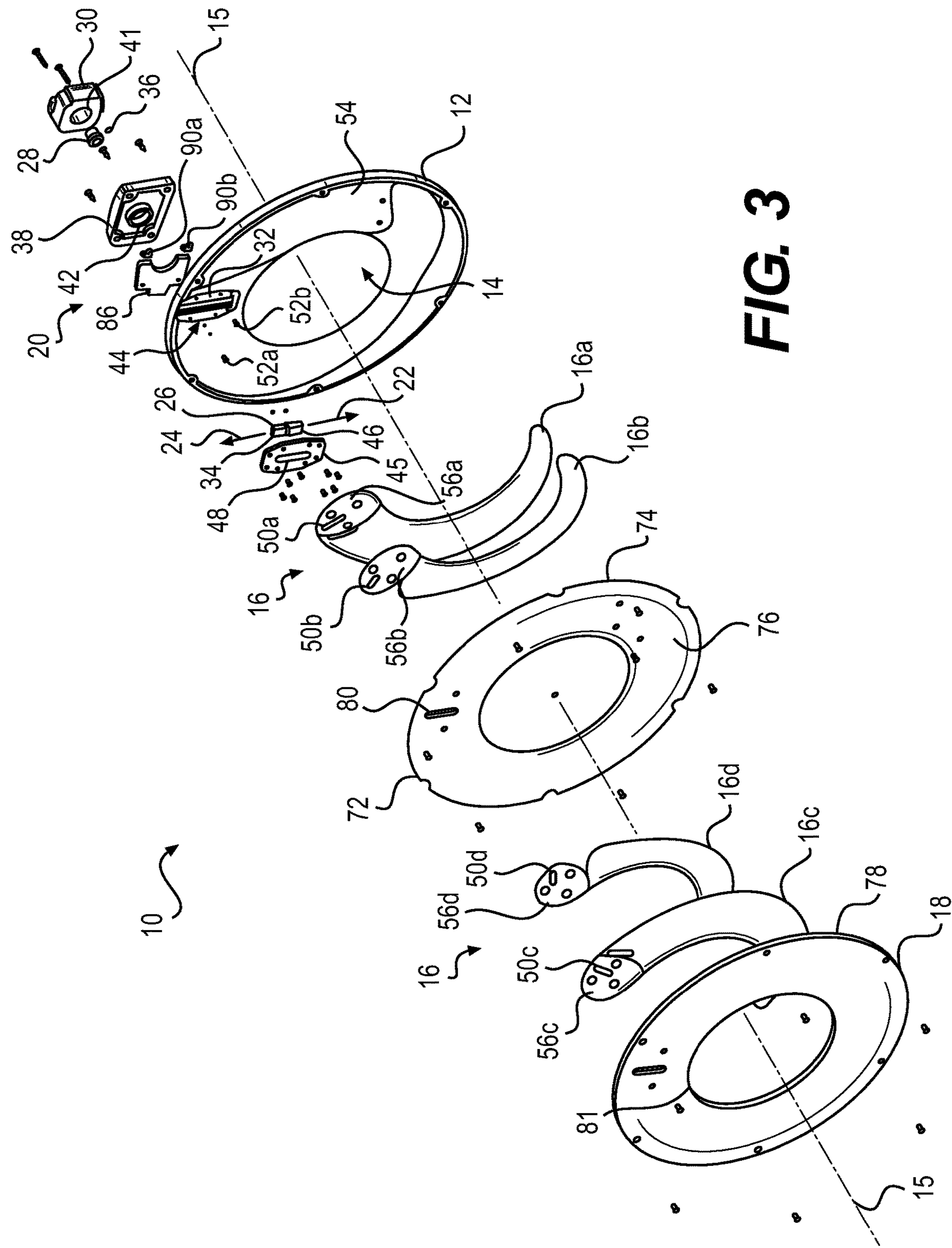
FIG. 3 illustrates an exploded view of the shutter shown in FIGS. 1 and 2.

FIGS. 1-3 illustrate an example shutter assembly (herein referred to as "the shutter") 10 of the present disclosure. In some examples, the shutter 10 may include a base plate 12. The shutter 10 may also include a cover 18 attached to the base plate 12. The shutter 10 may be used in any photographic, scientific, calibration, and/or other application requiring one or more cycles of opening and closing of a central opening or aperture.

As shown in at least FIGS. 1-3, the base plate 12 may define a shutter opening 14 (e.g., an aperture) of the shutter 10. Although FIGS. 1-3 illustrate a circular shutter opening 14, in further example embodiments, the shutter opening 14 may have any other useful shape, size, and/or other configuration. For example, the shutter opening 14 may be substantially square, substantially rectangular, substantially oval-shaped, and/or any other shape useful in shutter applications. The shutter opening 14 may be exposed and/or blocked by respectively opening and/or closing at least one shutter blade 16, and in some embodiments, a plurality of shutter blades 16. As shown in at least FIG. 3, the plurality of shutter blades 16 may include a first pair of shutter blades 16*a*, 16*b*, and a second pair of shutter blades 16*c*, 16*d*. In other example embodiments, the shutter 10 may include greater than or less than four shutter blades 16*a*, 16*b*, 16*c*, 16*d*, and in such examples, the shutter blades 16 may be paired, grouped, and/or otherwise associated in any configuration. In some examples, two or more of the shutter blades 16 may be configured to move in unison (e.g., substantially simultaneously).

The example shutter 10 may include two or more shutter blades 16, and such shutter blades 16 may be configured to pivot and/or rotate across the shutter opening 14. For example, FIGS. 1 and 2 illustrate an example closed position in which the shutter blades 16 substantially block light from passing through the shutter opening 14. The shutter blades 16 may also be transitioned from this closed position to an open position (shown in FIG. 8) in which the shutter blades 16 permit light to pass through the shutter opening 14. In the open position, the plurality of shutter blades 16 may, for example, expose the shutter opening 14 for light to pass therethrough. In the closed position, on the other hand, the plurality of shutter blades 16 may substantially occlude the shutter opening 14. In another example embodiment, the example shutter 10 may include only a single shutter blade 16. In such an example embodiment, the single shutter blade 16 may be in the example closed position such that it substantially blocks light from passing through the shutter opening 14. The single shutter blade 16 may also be transitioned from the closed position to an open position in which the single shutter blade 16 permits light to pass through the shutter opening 14. In the open position, the single shutter blade 16 may, for example, expose the shutter opening 14 for light to pass therethrough. In the closed position, on the other hand, the single shutter blade 16 may substantially occlude the shutter opening 14.

As shown in FIGS. 1-3, the shutter 10 may also include a drive assembly 20. In an example embodiment, one or more of the shutter blades 16 may be operably connected to the drive assembly 20, and the drive assembly 20 may be configured to provide a first force to (e.g., the drive assembly 20 may be configured to act upon) one or more of the shutter blades 16 in a first substantially linear direction 22, and such a first force may transition the shutter blades 16 to the closed position. The drive assembly 20 may also be configured to provide a second force to (e.g., the drive assembly 20 may be configured to act upon) the one or more shutter blades 16 in a second substantially linear direction 24 opposite the first direction 22, and such a second force may transition the shutter blades 16 to the open position (FIG. 8). In some examples, the first and second forces described above may be applied in a common plane that extends substantially perpendicular to a longitudinal axis 15 of the shutter 10. Such an example longitudinal axis 15 may pass substantially centrally through the shutter opening 14, and in such examples, the first and second directions 22, 24 described above may extend substantially perpendicular to (e.g., may extend substantially radially relative to) the longitudinal axis 15. It is understood that the first and second forces described above may be constant and/or may be variable along any portion of the range of travel of the shutter blades 16. For example, an increase in such a force may cause a corresponding increase in a speed of rotation (e.g., an acceleration) of one or more of the shutter blades. Conversely, a decrease in such a force may cause a corresponding decrease in a sped of rotation (e.g., a deceleration) of one or more of the shutter blades 16.

The drive assemblies 20 described herein may include one or more components configured to impart the first and/or second forces described above to drive rotation of the shutter blades 16. For example, the drive assembly 20 may include a drive rack 26, a pinion gear 28 configured to drive linear movement of the drive rack 26, and an actuator 30 configured to drive rotation of the pinion gear 28. In such embodiments, at least part of the drive rack 26 (e.g., a base, tongue, flange, shoulder, or other structural component of the drive rack 26) may be disposed within a slot, channel, groove, and/or other like structure defined by the base plate 12, and may be slidably and/or otherwise movably coupled thereto. For example, the base plate 12 may include a substantially linear channel 32. In such an example embodiment, a male component of the drive rack 26 may be movably disposed within the channel 32. Alternatively, in other examples, the drive rack 26 may include a slot, channel, groove, and/or other like female structure, and the base plate 12 may include a corresponding male structure to facilitate guided movement of the drive rack 26 in the first and second directions 24, 26 relative to the base plate 12. In any of the examples described herein, the drive rack 26 may include one or more teeth 34 configured to mate with one or more corresponding teeth 36 of the pinion gear 28. In such examples, rotation of the pinion gear 36 (e.g., about a rotation axis extending substantially parallel to the longitudinal axis 15 of the shutter 10) may drive substantially linear movement of the drive rack 26 relative to the base plate 12. It is understood that such substantially linear movement (e.g., movement in the first and second directions 22, 24 described above) may be guided, governed, restricted, and/or otherwise directed by the channel 32.

In example embodiments, the actuator 30 may be configured to actuate, rotate, and/or otherwise move the pinion gear 28 relative to the base plate 12. For example, the actuator may be mounted on and/or otherwise connected to a plate, bracket, housing, and/or other mount 38, and the mount 38 may be mounted on and/or otherwise connected to an outer surface 40 of the base plate 12. The pinion gear 28 may be mounted on and/or otherwise connected to an output shaft 41 of the actuator 30 such that rotation of the output shaft 41 may drive commensurate rotation of the pinion gear 28. For example, at least part of the output shaft 41 of the actuator 30 and/or at least part of the pinion gear 28 may extend through an orifice 42 formed by the mount 38. In such examples, the at least part of the output shaft 41 and/or the at least part of the pinion gear 28 may also extend through an orifice 44 formed by the base plate 12 such that the teeth 36 of the pinion gear 28 may mate with corresponding teeth 34 of the drive rack 26. In such examples, driving rotation of the pinion gear 28 with the actuator 30 may cause movement of the drive rack 26 in either the first direction 22 or the second direction 24. Such movement of the drive rack des 26 may cause commensurate movement of one or more of the shutter blades 16 in contact with the drive rack 26. Further, as shown in FIG. 3, the shutter 10 may include one or more retention plates 45 coupled to the base plate 12 and configured to retain the drive rack 26 at least partially within the channel 32 as the pinion gear 28 drives movement of the drive rack 26 in the first direction 22 and the second direction 24. In such examples, the drive rack 26 may be movably disposed between the base plate 12 and the retention plate 45.

In example embodiments, the actuator 30 may comprise, for example, one or more stepper motors or other like electronic motors configured to rotate the pinion gear 28 in a clockwise and/or counter-clockwise direction about a rotation axis extending substantially centrally through the output shaft 41. The stepper motor may be located on a first side of the base plate 12 that is opposite to a second side of the base plate 12 on which the drive rack 26 is disposed. In some examples, the actuator 30 and/or the drive assembly 20, generally, may include one or more additional gears, linkages, arms, shafts, and/or other structures (not shown) operably connecting the actuator 30 and/or the pinion gear 28 to the drive rack 26 to facilitate movement of the drive rack 26 in response to activation of the actuator 30. In some embodiments, multiple actuators 30 (e.g., stepper motors, electric motors, solenoids, etc.) may be included. For example, the drive assembly 20 may include a respective stepper motor or other electric motor connected to and/or otherwise configured to control the movement of each shutter blade 16. In such examples, each stepper motor or other actuator 30 may include a respective pinion gear 28 connected to an output shaft of the actuator 30, and each respective pinion gears 28 may be coupled to a respective drive rack 26. The multiple actuators 30, drive racks 26, and other components in such examples may be positioned at any location on the base plate 12 about the aperture 14. For instance, in some examples a first actuator 30 may be positioned at a first location on the outer surface 40 of the base plate 12 (e.g., the position of the actuator 30 shown in FIG. 1), and a second actuator 30 may be positioned at a second location on the outer surface 40 that is substantially opposite from (e.g., spaced approximately 180 degrees from, relative to the axis 15) the first location.

In alternate embodiments, the drive assembly 20 may include two or more actuators 30 coupled and/or otherwise operably connected to a single drive rack 26. For example, such embodiments may include a first stepper motor (or other electric motor) having a first pinion gear 28 coupled to a first end of the drive rack 26, and a second stepper motor (or other electric motor) having a second pinion gear 28 coupled to a second end of the drive rack 26 opposite the first end of the drive rack 26. In any of the example embodiments described herein, the use of multiple stepper motors or other such actuators 30 may enable the drive assembly 20 to provide increased torque during operation. For instance, employing two actuators 30 acting on a common drive rack 26 may enable the drive assembly 20 to provide increased torque (e.g., approximately double) when transitioning the shutter blades 16 between the open and closed positions described herein. Additionally, or alternatively, employing multiple actuators 30, where each of the multiple actuators 30 acts on a respective drive rack 26, may enable such multi-actuator drive assemblies 20 to provide increased torque to the shutter blades 16 connected to the respective drive racks 26. Any such examples may allow for the use of larger shutter openings 14 and corresponding larger shutter blades 16.

Alternatively, and/or in addition to the actuator 30 described above, the shutter 10 may include one or more solenoids configured to impart motion to the drive rack 26 and/or the shutter blades 16. For example, in an additional embodiment one or more permanent magnets (not shown) may be coupled to the drive rack 26, and such permanent magnets may be substantially aligned with one or more corresponding solenoids of the shutter 10. For example, to transition the shutter blades 16 between the open and closed positions, the one or more solenoids may be energized to repel and/or attract the respective one or more permanent magnets coupled to the drive rack 26. In such an example embodiment, the drive assembly 20 and/or shutter blades 16 of the shutter 10 may be stable, biased, and/or locked in the closed position when the one or more solenoids are de-energized. Alternatively, the shutter 10 may be configured such that the drive assembly 20 and/or shutter blades 16 are stable, biased, or locked in the open position when the one or more solenoids are de-energized. In embodiments, there may be a solenoid for each shutter blade 16. In alternate embodiments, there may be two solenoids, the two solenoids being located at opposite ends of the drive rack 26. In embodiments, there may be multiple drive racks 26, with each drive rack 26 including a corresponding one or more solenoids. Use of multiple solenoids may provide increased torque when acting on the same drive rack 26, which may in turn allow for larger shutter openings 14 that may require larger shutter blades 16.

In some examples, the drive rack 26 may be coupled to and/or otherwise in contact with at least one of the shutter blades 16 such that movement of the drive rack 26 may drive commensurate movement of the shutter blades 16 between the open position and the closed position. For example, the drive rack 26 may include one or more pins 46 in contact with each of the shutter blades 16. The pin 46 may extend substantially parallel to the longitudinal axis 15, and may extend outwardly from a top surface of the drive rack 26. For example, at least part of the pin 46 may be movably disposed within and/or may extend through a slot 48 formed by the retention plate 45. In such examples, the pin 46 may also be movably disposed within and/or may extend through slots 50*a*, 50*b*, 50*c*, 50*d* formed in each of the shutter blades 16*a*, 16*b*, 16*c*, 16*d*. As can be seen in at least FIG. 3, the shutter 10 may also include one or more pins 52*a*, 52*b* connected to and/or otherwise extending from an inner surface 54 of the base plate 12. In some examples, the pins 52*a*, 52*b* may extend substantially parallel to the longitudinal axis 15. In any of the examples described herein, one or more of the shutter blades 16 may be movably connected to one of the pins 52*a*, 52*b* such that movement of the pin 46 within respective slots 50*a*, 50*b*, 50*c*, 50*d* of the one or more shutter blades 16 may cause the shutter blades 16 to rotate and/or pivot about the pin 52*a*, 52*b* to which the shutter blade is connected. For example, the shutter blades 16*a*, 16*b* may form one or more orifices 56*a*, 56*b*, and the pin 52*a* may extend through the orifices 56*a*, 56*b*. In such examples, movement of the pin 46 within the respective slots 50*a*, 50*b* (e.g., in the first direction 22 and/or in the second direction 24) drives rotation of the shutter blades 50*a*, 50*b* about the pin 52*a*. Likewise, the shutter blades 50*c*, 50*d* may form one or more orifices 56*c*, 56*d*, and the pin 52*b* may extend through the orifices 56*c*, 56*d*. In such examples, movement of the pin 46 within the respective slots 50*c*, 50*d* (e.g., in the first direction 22 and/or in the second direction 24) drives rotation of the shutter blades 50*c*, 50*d* about the pin 52*b*.

Figure 4A:
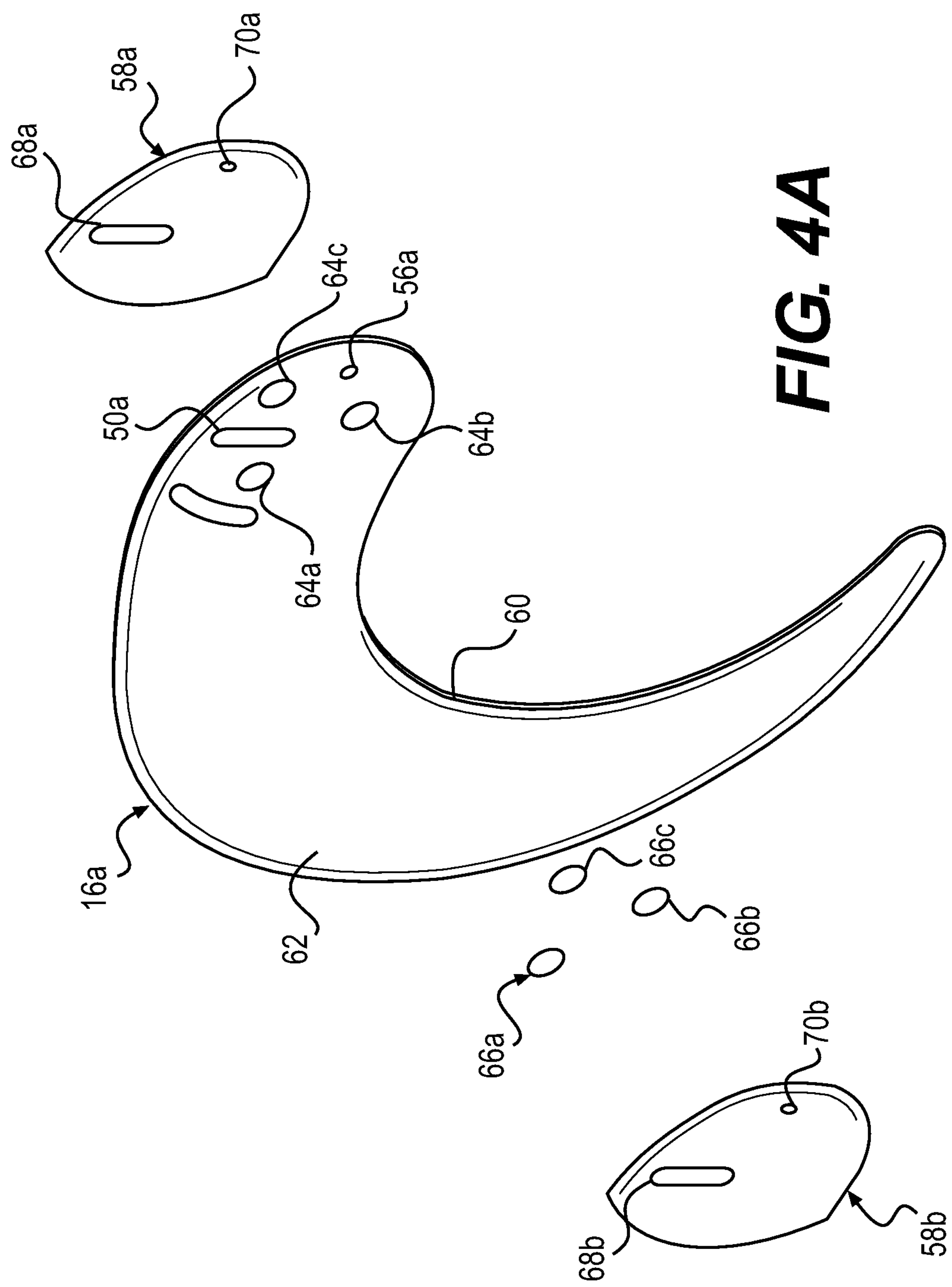
FIG. 4A illustrates an individual shutter blade associated with the shutter of FIGS. 1 and 2.

In an example, the shutter 10 may include one or more structures configured to assist in stabilizing one or more of the shutter blades 16 and/or to assist in guiding motion of one or more of the shutter blades 16 as the shutter blades 16 rotate about the respective pins 52*a*, 52*b* extending from the base plate 12. For example, as shown in at least FIG. 4A, one or more of the shutter blades 16 (the shutter blade 16*a* is shown in FIG. 4A for description purposes, but the following description may apply to any of the shutter blades 16 described herein) may include one or more reinforcement plates 58*a*, 58*b*. In some examples, the shutter blades 16 may be made from one or more substantially rigid plastics or other polymers (e.g., Kevlar) configured to resist degradation caused by applications associated with repeated, high-speed motion over long periods of time. Nevertheless, the slots 50*a*, orifices 56*a*, and/or other portions of the respective shutter blades 16 may wear over time due to such motion. As a result, the reinforcement plates 58*a*, 58*b* may be useful in extending the useful life of the shutter blades 16. In some examples, the reinforcement plates 58*a*, 58*b* may be made from one or more substantially rigid metals or alloys (e.g., aluminum, titanium, stainless steel, etc.) configured to withstand repeated shutter operations over time. In an example embodiment, the reinforcement plates 58*a*, 58*b* may be made from a thicker and/or more durable polymer than the shutter blades 16*a*, 16*b*.

In such examples, a reinforcement plate (e.g., a first reinforcement plate 58*a*) may be adhered and/or otherwise connected to a first surface 60 of the shutter blade 16*a*. Additionally, or alternatively, a reinforcement plate (e.g., a second reinforcement plate 58*b*) may be adhered and/or otherwise connected to a second surface 62 of the shutter blade 16*a* opposite the first surface 60. In still further examples, one or more of the reinforcement plates 58*a*, 58*b* described herein may be rigidly connected to a respective shutter blade 16 by means other than adhesives. For example, as shown in FIG. 4A, a shutter blade 16*a* may include one or more orifices 64*a*, 64*b*, 64*c* shaped, sized, positioned, and/or otherwise configured to accept a corresponding reinforcement disc 66*a*, 66*b*, 66*c*. Such reinforcement discs 66*a*, 66*b*, 66*c* may be made from the same material as, for example, the one or more reinforcement plates 58*a*, 58*b*. As a result, in such embodiments, the reinforcement discs 66*a*, 66*b*, 66*c* may facilitate spot welding the first reinforcement plate 58*a* to the second reinforcement plate 58*b* via the orifices 64*a*, 64*b*, 64*c*. It is understood that the reinforcement plates 58*a*, 58*b* may form respective slots 68*a*, 68*b* which substantially align with and/or overlay the slot 50*a* of the shutter blade 16*a* when the reinforcement plates 58*a*, 58*b* are connected to the shutter blade 16*a*. The reinforcement plates 58*a*, 58*b* may also form respective orifices 70*a*, 70*b* which substantially align with and/or overlay the orifice 56*a* of the shutter blade 16*a* when the reinforcement plates 58*a*, 58*b* are connected to the shutter blade 16*a*. In such examples, the pin 46 of the drive rack 26 may pass through the slots 68*a*, 68*b* of the respective reinforcement plates 58*a*, 58*b* in order to drive rotation of the shutter blades 16. Similarly, one of the pins 52*a*, 52*b* extending from the inner surface 54 of the base plate 12 may pass through the orifices 70*a*, 70*b* of the respective reinforcement plates 58*a*, 58*b* such that movement of the pin 46 within the slots 68*a*, 68*b* of the respective reinforcement plates 58*a*, 58*b* may cause rotation of a respective one of the shutter blades 16*a* about a respective one of the pins 52*a*, 52*b*.

Figure 4B:
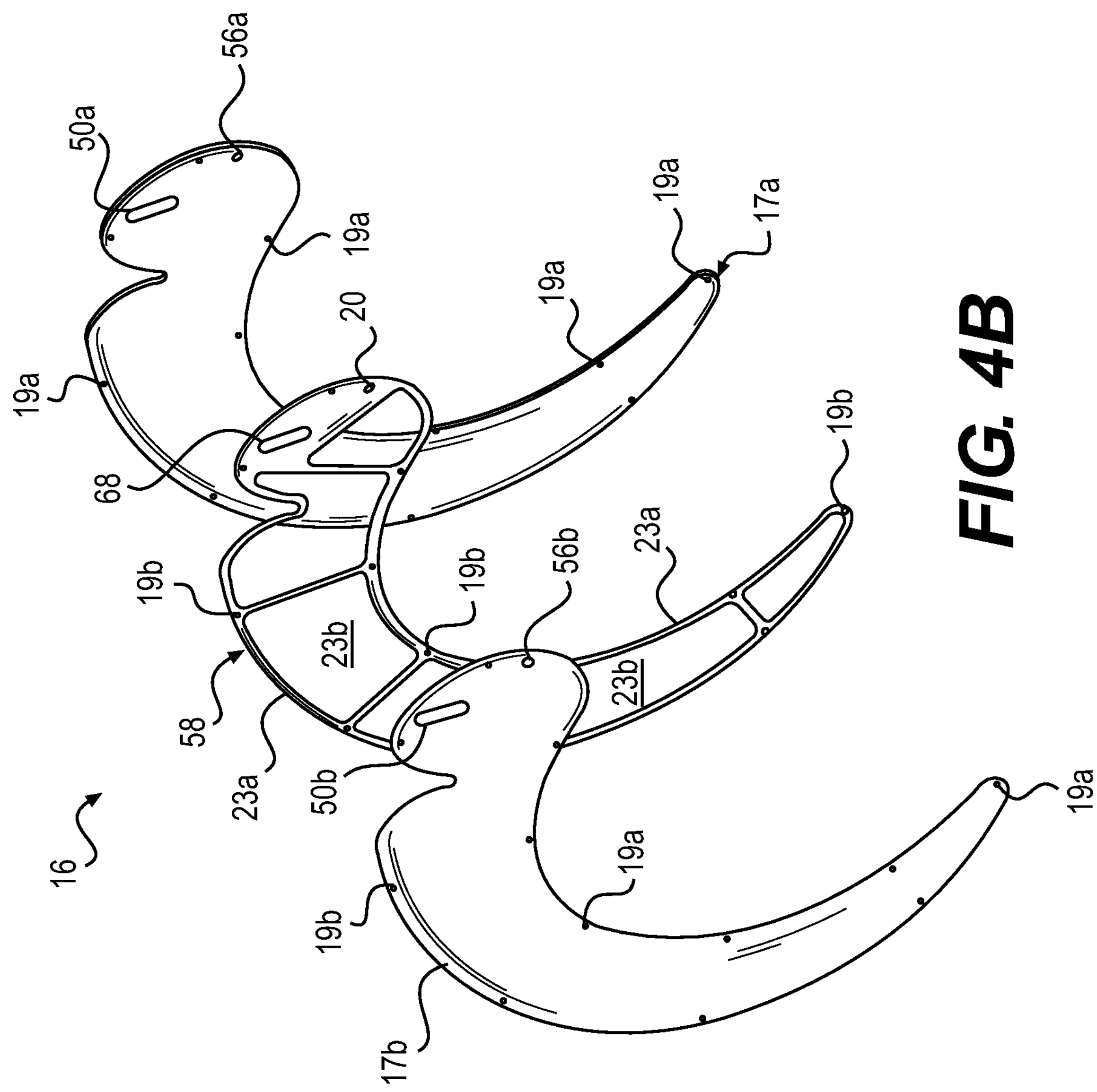
FIGS. 4B-4D illustrate exploded views of example shutter blades and reinforcements plates of the present disclosure.
Figure 4C:
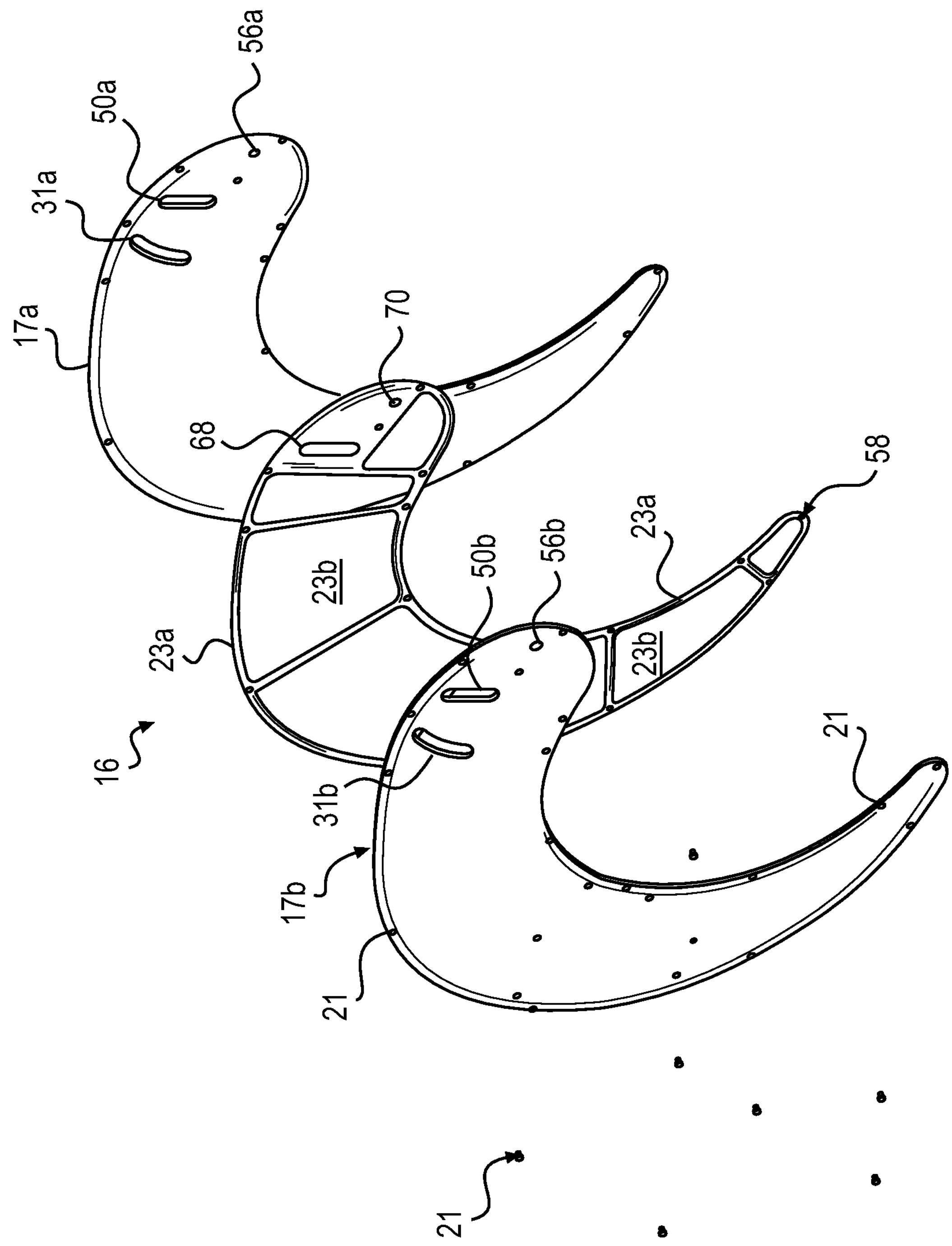

Referring to FIG. 4B, in some embodiments, a press fit or snapping configuration may be provided wherein a single reinforcement plate 58 is located between two blade skins 17*a*, 17*b* to provide a reinforced shutter blade 16. The bladed skins 17*a*, 17*b* may be snapped to the reinforcement plate using cooperating “male” and “female” components to facilitate a press fit. For example, pins 19*a* on the blade skins 17*a*, 17*b* may be press fit into holes 19*b* defined in the reinforcement plate 58. Referring to FIG. 4C, in further examples, rivets 21 may be used to couple the reinforcement plate 58 to the two blade skins 17*a*, 17*b*. As can be seen in FIGS. 4B and 4C, in some embodiments, the reinforcement plate 58 may be a reinforcement frame or “skeleton” type design that includes stabilizing portions 23*a* that define one or more openings 23*b*. In such examples, the reinforcement plate 58 may comprise a substantially rigid frame member providing increased strength and/or rigidity to the shutter blade 16. Additionally, in such examples, the openings 23*b* defined by the reinforcement plate 58 may reduce the overall weight of the reinforcement plate 58. As can be seen from FIGS. 4B and 4C, such example reinforcement plates 58 may further include any of the slots 68, orifices 70, or other components described above with respect to the reinforcement plates 58*a*, 58*b* shown in FIG. 4A. Additionally, the example blade skins 17*a*, 17*b* shown in FIGS. 4B and 4C may also include any of the corresponding slots 50*a*, 50*b*, orifices 56*a*, 56*b*, or other components described above with respect to the shutter blade 16*a* shown in FIG. 4A. Additionally, as may be seen in FIG. 4C, an additional slot 31*a*, 31*b* may be included on blade skins 17*a*, 17*b*, respectively. The extra slots 31*a*, 31*b* may allow for weight reduction of the overall weight of the blade skins 17*a*, 17*b* and the resulting shutter blade 16.

Figure 4D:
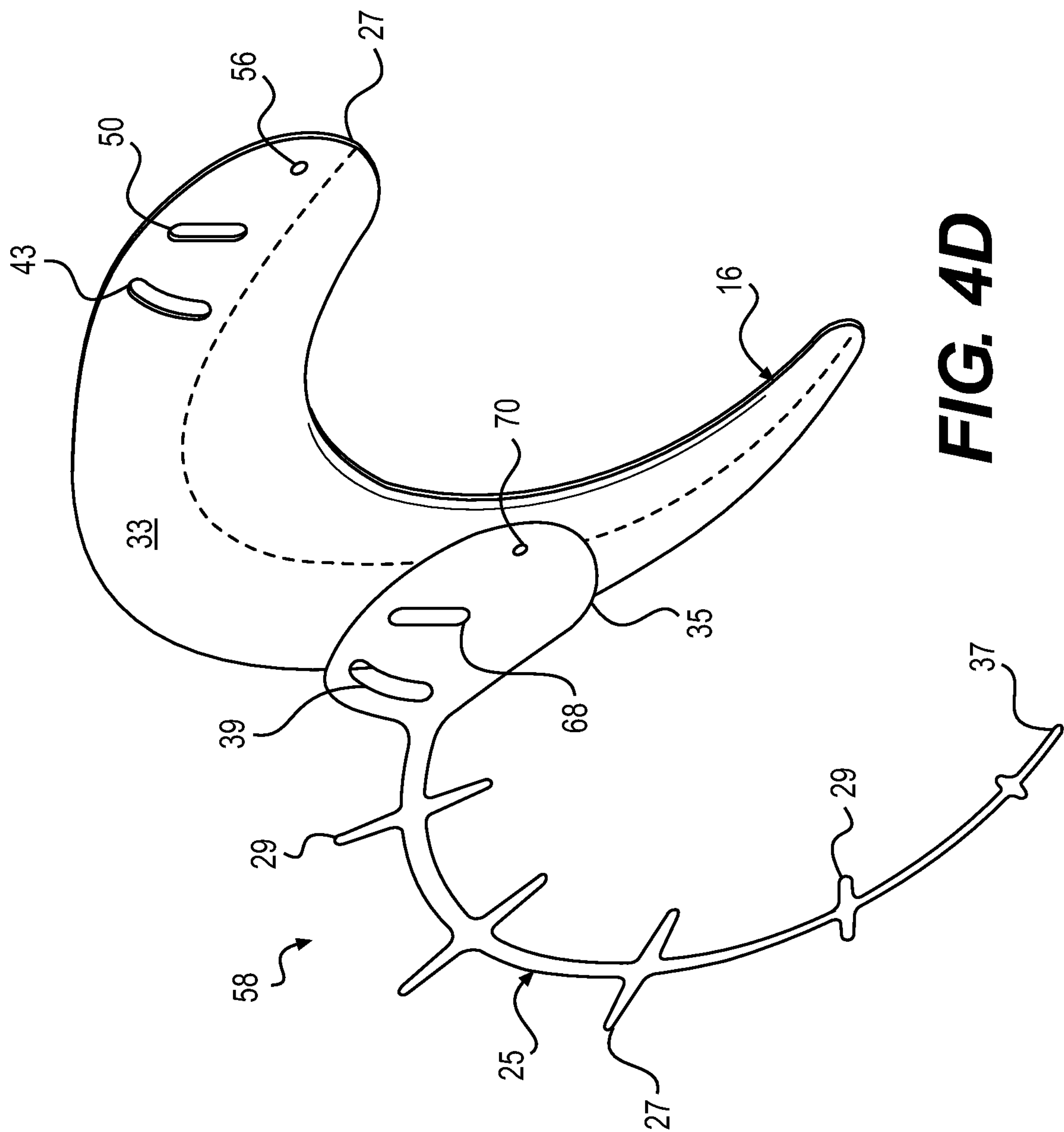

Referring to FIG. 4D, in further examples the reinforcement plate 58 may be in the form of a reinforcement spine 25, and the reinforcement plate 58 may be coupled to a shutter blade 16 using a suitable connection as described herein, e.g., an adhesive, cooperating pins and holes, rivets, etc. Spine 25 may extend substantially centrally along a curved or arcuate centerline 27 of the shutter blade 16. Plate 58 may also include one or more legs or other components 29 extending from the spine 25 and along an outer surface 33 of the blade 16. For example, pairs of legs 29 may be spaced laterally along a length of the spine 25. Each leg 29 may extend at any included angle relative to the spine 25. In some examples, one or more of the legs 29 may extend substantially perpendicularly from the spine 25. The spine 25 may be curved so as to substantially follow the curvature of the arcuate centerline 27 of the shutter blade 16. Similarly, one or more legs 29 may have an arcuate or curved configuration. Alternatively, one or more legs 29 may be substantially straight/linear. Spine 25 may have a first thickness/rigidity, while one or more of the legs 29 may have a second thickness/rigidity less than the first thickness/rigidity of the spine 25. Alternatively, legs 29 and spine 25 may have the same/uniform thickness/rigidity. Also, the length of each leg 29 may differ. Additionally, plate 58 shown in FIG. 4D may further include any of the slots 68, orifices 70, or other components described above with respect to the reinforcement plates 58*a*, 58*b* shown in FIG. 4A. In such examples, longer legs 29 may be located near a first end 35 of spine 25 proximate the slot 68/orifice 70, and relatively shorter legs 29 may be located near a second end 37 of spine 25 opposite the first end 35. Additionally, as may be seen in FIG. 4D, an additional slot 39 may be included on plate 58 and an additional slot 43 may be included on shutter blade 16. The extra slots 39, 43 may allow for weight reduction of the overall weight of the plate 58 and the shutter blade 16. Plates 58 shown in FIG. 4B-4D may be made from any of the substantially rigid materials described above with respect to the plates of FIG. 4A.

Referring back to FIG. 3, the shutter 10 may also include a guide plate 72 configured to guide motion of one or more of the shutter blades 16. For example, the shutter blades 16*a*, 16*b* may be disposed between a first surface 74 of the guide plate 72 and the inner surface 54 of the base plate, and the shutter blades 16*c*, 16*d* may be disposed between a second surface 74 of the guide plate 72, opposite the first surface 74, and an inner surface 78 of the cover 18. In such examples, the shutter blade 16*a* may be disposed between the shutter blade 16*b* and the base plate 12, and the shutter blade 16*b* may be disposed between the shutter blade 16*a* and the guide plate 72. Likewise, the shutter blade 16*d* may be disposed between the shutter blade 16*c* and the guide plate 72, and the shutter blade 16*c* may be disposed between the shutter blade 16*d* and the cover 18. In such example embodiments, the shutter blade 16*b* may be disposed adjacent the first surface 74 and may, for example, be slidably movable along and/or in contact with at least a portion of the first surface 74 when the shutter blades 16 move between the open position and the closed position. Similarly, the shutter blade 16*d* may be disposed adjacent the second surface 76 and may, for example, be slidably movable along and/or in contact with at least a portion of the second surface 76 when the shutter blades 16 move between the open position and the closed position. In such examples, the first and second surfaces 74, 76 may comprise bearing surfaces of the guide plate 72 configured to contact at least a portion of the shutter blade 16. The first and second surfaces 74, 76 may be configured to guide, for example, movement of the shutter blades 16 as the shutter blades 16 are driven to rotate about the respective pins 52*a*, 52*b*, and contact between one or more of the shutter blades 16 and the first and second surfaces 74, 76 may assist in maintaining the shutter blades 16 in a substantially parallel arrangement with respect to one another within the shutter 10. In additional example embodiments, the inner surface 54 of the base plate 12 and/or the inner surface 78 of the cover 18 may comprise one or more additional bearing surfaces configured to assist in guiding movement of the shutter blades 16. In example embodiments, any of the bearing surfaces described herein with respect to the guide plate 72, the base plate 12, and/or the cover 18 may include one or more slots, grooves, and/or channels (not shown) etched, cut, and/or otherwise formed therein. Such example bearing surface configurations may further assist in guiding rotational movement of the shutter blades 16 about the respective pins 52*a*, 52*b*.

As shown in FIG. 3, the guide plate 72 may form a slot 80 which substantially aligns with and/or overlays the respective slots 50*a*, 50*b*, 50*c*, 50*d* of the shutter blades 16*a*, 16*b*, 16*c*, 16*d*. In such examples, the pin 46 of the drive rack 26 may pass through the slot 80 of the guide plate 72 in order to drive rotation of the shutter blades 16.

The cover 18 may comprise a substantially planar, substantially disc-shaped, substantially square, or substantially rectangular plate having an opening 81. The opening 81 may be, for example, a central opening disposed substantially concentric with, for example, the central axis 15 such that the central axis 15 may extend substantially centrally through the opening 81 of the cover 18, and substantially centrally through corresponding openings of the guide plate 72 and of the base plate 12.

Although not illustrated in the example embodiment of FIG. 3, in some examples the shutter 10 may include one or more stops, dampers, bumpers, shoulders, and/or other components of the shutter 10 to configured to assist in limiting motion of one or more of the shutter blades 16 at the open and/or closed positions. During use, one or more of the shutter blades 16 may impact, impinge upon, abut, and/or otherwise come into contact with one or more such structures. For example, at least one stop of the shutter 10 may be positioned proximate an outermost perimeter of the inner surface 54 of the base plate 12 such that at least one of the shutter blades 16 may abut, impact, and/or otherwise contact the at least one stop at the open position. Similarly, at least one stop of the shutter 10 may be positioned on the inner surface 54 proximate a perimeter of the shutter opening 14 such that at least one of the shutter blades 16 may abut, impact, and/or otherwise contact the at least one stop at the closed position. In such example embodiments, the one or more stops, dampers, bumpers, shoulders, and/or other like components may be formed integrally with and/or mounted to the base plate 12 or other non-moving components of the shutter 10 to assist in limiting motion and/or damping movement of the shutter blades 16.

As noted above, at least one of the stops described herein may comprise a bumper, a damper, and/or other like component configured to damp the motion of a moving component of the shutter 10 upon being impacted by such a component. As such, the function and/or operation of the stops described herein may be different than other known dampers, such as friction dampers, which apply a damping force to moving components by remaining in constant physical and/or frictional contact with such components. To account for this difference in function and/or performance, the stops of the present disclosure may be made from materials, such as rubber, plastics, polymers, and/or other like materials, that are less brittle and more malleable than known friction damper materials. Such known friction damper materials typically include, for example, metals, alloys, ceramics, composites, and/or other like materials.

As shown in FIG. 1, the shutter 10 may be connected to a controller 82 via one or more cables or other couplings suitable for transmitting power, control signals, data, and/or information between the controller 82 and components of the shutter 10. The controller 82 may be, for example, any computer, processor, server, and/or other like device configured to process information received from the shutter 10 and to control the operations of the shutter 10. For example, the controller 82 may be a control component of a camera or other photographic device to which the shutter 10 is connected for use. In an example embodiment, the controller 82 may direct a current and/or a voltage to the actuator 30 of the shutter 10. For example, the controller 82 may be connected to a power source 84, and may direct a current and/or a voltage from the power source 84 to the actuator 30 to drive rotation of the pinion gear 28, thereby driving substantially linear movement of the drive rack 26 and commensurate rotation of the shutter blades 16. For example, the controller 82 may operate to energize the actuator 30 to induce desired rotation of the pinion gear 28 (e.g., rotation at a desired speed and/or at a desired acceleration), and rotation of the pinion gear 28 may induce rotation of the drive rack 26 to transition the shutter blades 16 between the open and closed positions.

In example embodiments, the power source 84 may comprise one or more batteries or other power storage devices. The power source 84 may be a dedicated power source of the controller 82 and/or of the shutter 10. Alternatively, the power source 84 may comprise a dedicated power source of the camera or other device to which the shutter 10 is connected for use. In the example embodiments described herein, the power source 84 may be rechargeable, and may be removably connected to at least one of the controller 82, the camera, or other device to which the shutter 10 is connected.

In example embodiments, the shutter 10 may also include one or more drivers, amplifiers, inverters, capacitors, resistors, inductors, filters, and/or other current and/or voltage-shaping components (referred to herein as "electrical components") commonly utilized in electrical circuits. Such electrical components may, for example, assist in reversing the current or reversing the polarity of the voltage directed to the actuator 30. Such electrical components may also assist in directing one or more signals between the controller 82 and other components of the shutter 10, such as, for example, the actuator 30. Such signals may include, for example, control signals, sensor signals, and/or power signals. For example, the shutter 10 may include one or more printed circuit boards 86 including one or more of the electrical components noted above. In such embodiments, the actuator 30 may be operably (e.g., electrically) connected to the printed circuit board 86, and thus, to the various electrical components included in the printed circuit board 86. Likewise, the controller 82 and the power source 84 may be operably connected to the printed circuit board 86, and thus, to the electrical components. In this way, the electrical components of the printed circuit board 86 may assist in transmitting, shaping, conditioning and/or modifying signals sent between the controller 82 and/or the power source 84, and other components of the shutter 10, such as, for example, actuator 30.

In addition to the electrical components described above, the printed circuit board 86 may include one or more connectors 88 (FIG. 1) configured to facilitate a mechanical, electrical and/or otherwise operable connection between the printed circuit board 86 and, for example, the controller 82 and/or the power source 84. For example, the connector 88 may comprise a male or female coupling configured to assist in transmitting control, power, and/or sensor signals between the printed circuit board 86 and the controller 82. In example embodiments, the connector 88 may comprise a female USB port or other like coupling configured to mate with, for example, a corresponding male connector. In such embodiments, the connectors 88 may be configured to facilitate a removable, detachable, and/or otherwise releasable connection between the printed circuit board 86 and, for example, one or more cables extending from the shutter 10 to the controller 82 and/or the power source 84. Alternatively, in further example embodiments the connector 88 may be omitted. In such example embodiments, at least the controller 82 may be hardwired and/or otherwise substantially permanently operably connected to the printed circuit board 86. In an example embodiment, the printed circuit board 86 and/or the controller 82 may be configured to be coupled to external components as previously described, and may also be configured to control the various operations of the shutter 10 without being connected to such off-board components. For instance, in some embodiments the shutter 10 may include the connector 88 described above. In such embodiments, the shutter 10 may also include an on-board controller 82 that is hardwired and/or otherwise substantially permanently operably connected to the printed circuit board 86. In such examples, the on-board controller 82 may control operation of the shutter 10 when the connector 88 is not operably connected and/or otherwise coupled to the external control components described above. In such examples, when the connector 88 is operably connected to such external control components, such external control components may be used to control one or more operations of the shutter 10 either alone or in combination/cooperation with the on-board controller 82.

The shutter 10 may also include one or more sensors 90*a*, 90*b* configured to assist in detecting the position of one or more of the shutter blades 16, the drive rack 26, the pinion gear 28, and/or any other moving parts of the shutter 10. Information regarding such detected positions may assist in controlling movement of one or more of these moving parts. For example, such sensors 90*a*, 90*b* may send signals, information, and/or data to the controller 82, thereby forming part of a feedback control loop for controlling operation of the shutter 10. In an example embodiment, one or more components of such sensors 90*a*, 90*b* may be disposed on and/or otherwise embedded substantially within the printed circuit board 86 and/or the base plate 12. Alternatively, or in addition, one or more components of such sensors 90*a*, 90*b* may be disposed on and/or otherwise embedded within one or more moving components of the shutter 10, such as, for example, the pinion gear 28, the drive rack 26, and/or one or more of the shutter blades 16. In such embodiments, movement of the pinion gear 28, the drive rack 26, and/or one or more of the shutter blades 16 may result in commensurate movement of the one or more sensor components connected thereto.

In example embodiments, one or more of the sensors 90*a*, 90*b* may comprise, for example, a proximity sensor, a Hall effect sensor, and/or any other type of motion detection device known in the art. Such, sensors 90*a*, 90*b* may include one or more magnets, photo eyes, triggers, flags and/or other such components. At least one of such components, may be coupled to, for example, the pinion gear 28, the drive rack 26, and/or one or more of the shutter blades 16, while a second or additional component of such sensors 90*a*, 90*b* may be mounted to a stationary component of the shutter 10, such as the base plate 12 and/or the printed circuit board 86. During operation, such sensors 90*a*, 90*b* may be aligned, positioned, and/or otherwise configured to detect a position of at least one of the pinion gear 28, the drive rack 26, and/or one or more of the shutter blades 16 as the shutter blades 16 move between the open and closed positions.

In some embodiments, the controller 82 may employ one or more control strategies configured to prevent damage to the actuator 30, the drive rack 26, the shutter blades 16, and/or other components. Such control strategies may include, for example, controlling the actuator 30 to stop rotation of the output shaft 41, thereby stopping commensurate movement of the respective shutter blades 16, in response to sensing, detecting, and/or otherwise determining one or more stop conditions. For example, the controller 82 may receive one or more signals from the various sensor 90*a*, 90*b* described herein, and as noted above, such signals may be indicative of the position of shutter blades 16, drive rack 26, output shaft 41, etc. In such examples, a first stop condition may comprise determining that the drive rack 26 has reached either the first end of its stroke (corresponding to the shutter blades 16 being in the open position) or a second end of its stroke (corresponding to the shutter blades 16 being in the closed position). If the controller 82 determines that this first stop condition has been satisfied, the controller 82 may control the actuator 30 to stop rotation of the output shaft 41. Doing so may minimize and/or substantially eliminate damage to shutter components caused by impact, over rotation, etc.

Additionally, some example control strategies of the present disclosure may cause the actuator 30 to stop rotation of the output shaft 41, thereby stopping commensurate movement of the respective shutter blades 16, in response to sensing, detecting, and/or otherwise determining one of multiple stop conditions. For instance, as noted in the example control strategy described above, the controller 82 may control the actuator 30 to stop rotation of the output shaft 41 in response to determining that a first stop condition (e.g., a stop condition associated with the sensed location of the drive rack 26 has been satisfied). In such examples, such a control strategy may also include, as a second layer of protection, controlling the actuator 30 to stop rotation of the output shaft 41 in response to sensing, detecting, and/or otherwise determining a second stop condition different from the first stop condition has been satisfied. Such a control strategy may assist in preventing damage to components of shutter 10 even in situations in which, for example, the sensors 90*a*, 90*b* or other shutter components providing signals or other information indicative of the first stop condition have failed.

For instance, in such a multi-stop condition control strategy, the controller 82 may determine (e.g., through sensors or through direct control or other means) the extent to which the output shaft has rotated in a particular direction. The extent of rotation may be determined based on counts or steps. In some examples, such steps may comprise a metric of the angular rotation of the output shaft. For instance, a single step may equal approximately one degree of angular rotation of the output shaft. In other examples, a single step may equal greater than or less than one degree of angular rotation (e.g., single step may equal approximately 0.5 degrees of angular rotation, 1.5 degrees of angular rotation, 1.8 degrees of angular rotation, 2.0 degrees of angular rotation, etc.). In such example multi-stop condition control strategies, in addition to controlling the actuator 30 to stop rotation of the output shaft 41 in response to determining the first stop condition described above associated with the sensed location of the drive rack 26, the controller 82 may also control the actuator 30 to stop rotation of the output shaft 41 in response to determining that a threshold (e.g., a maximum) number of steps has been reached. For example, in an embodiment, it is approximately 225 steps to move from sensor 90*a* to sensor 90*b*. This number of steps may vary depending on how far it is desired to move the rack and how large the shutter opening 14 (e.g., aperture) is. When used as a failsafe, it is not desirable for the steps to exceed a maximum number of steps. Thus, the threshold may be varied if it is desired to, for example, open the shutter 10 halfway (or any amount before full open). In such a situation, the new threshold will be approximately 112 steps. Such a threshold number of steps (e.g., a second stop condition different from the first stop condition described above) may comprise, indicate, and/or otherwise correspond to a maximum allowable angular rotation of the output shaft 41. In such examples, rotation of the output shaft 41 beyond such a threshold number of steps may cause damage to the one or more shutter blades 16, the drive rack 26, and/or other components of the shutter 10. Additionally, the controller 82 may limit an amount of time the actuator 30 may drive and/or attempt to drive the drive rack 26. For example, assume the actuator 30 is operating at 1000 Hz. In such a mode, 1 step=1 millisecond. To match the step count, the associated time limit may be 225 milliseconds. This time limit may vary like the step count if it is desired to move the shutter 10 to partially open. This time limit can also vary if it is desired to regulate the speed of opening. If the actuator 30 is operating at 100 Hz, the associated time limit may then be 2.25 seconds.

In some embodiments, one or more electromagnets may be placed on respective shutter blades 16 of the present disclosure. In such examples, the one or more electro magnets on the shutter blades 16 may cooperate with one or more electromagnets on the base plate 12 to assist in limiting motion of one or more of the shutter blades 16 at the open and/or closed positions. When the magnets on the shutter blades 16 reach a predetermined proximity to the magnets located on the base plate, the magnets on the shutter blades 16 cooperate with the magnets on the base plate 12 to stop further movement of the shutter blades 16. The controller 82 may control/operate the electromagnets to thereby control the predetermined proximity, and thereby control driving of the drive rack 26.

In embodiments, electromagnets may be located on base plate 12 (or alternatively on plate 45) disposed proximate to electromagnets on each end of drive rack 26 to damp driving of the drive rack 26. The controller 82 may control the electromagnets to determine at what proximity of the electromagnets encountering each other such that driving of the drive rack 26 should cease. Additionally, an electromagnet may be included on the drive rack 26 that fires at each end of the drive rack's stroke and cooperates with one or more electromagnets on the base plate 12 or plate 45 to damp movement of the drive rack 26. The controller 82 may control firing of the electromagnets to control the damping of the drive rack 26.

FIGS. 5-8 illustrate the shutter blades 16 of the example shutter 10 in various positions between the closed position (FIG. 5) and the open position (FIG. 8). It is understood that the shutter blades 16 may be substantially crescent shaped. Also, in some examples, the shutter blade 16*a* may be substantially the same shape, size, and/or other configuration as the shutter blade 16*c*, while the shutter blade 16*b* may be substantially the same shape, size, and/or other configuration as the shutter blade 16*d*. In such examples, the shutter blades 16*a*, 16*c* may be a different shape, size, and/or other configuration than one or both of the shutter blades 16*b*, 16*d*. Further, in some examples, a first shutter blade 16*a* may travel at a different speed and/or acceleration than a second shutter blade 16*b* of the shutter as the shutter blades 16 transition between the open position and the closed position. In some examples, as can be seen from the plan views of FIGS. 5-8, the shutter blade 16*a* may move at a greater speed and/or with a greater acceleration than the adjacent shutter blade 16*b* as the shutter blades 16 transition between the open position and the closed position. In such examples, the shutter blade 16*c* may move at a greater speed and/or with a greater acceleration than the adjacent shutter blade 16*d* as the shutter blades 16 transition between the open position and the closed position. Such differences in speeds and/or accelerations may be caused by the shape, angle, and/or orientation of the respective slots 50*a*, 50*b*, 50*c*, 50*d* formed in the shutter blades 16*a*, 16*b*, 16*c*, 16*d*.

Figure 9:
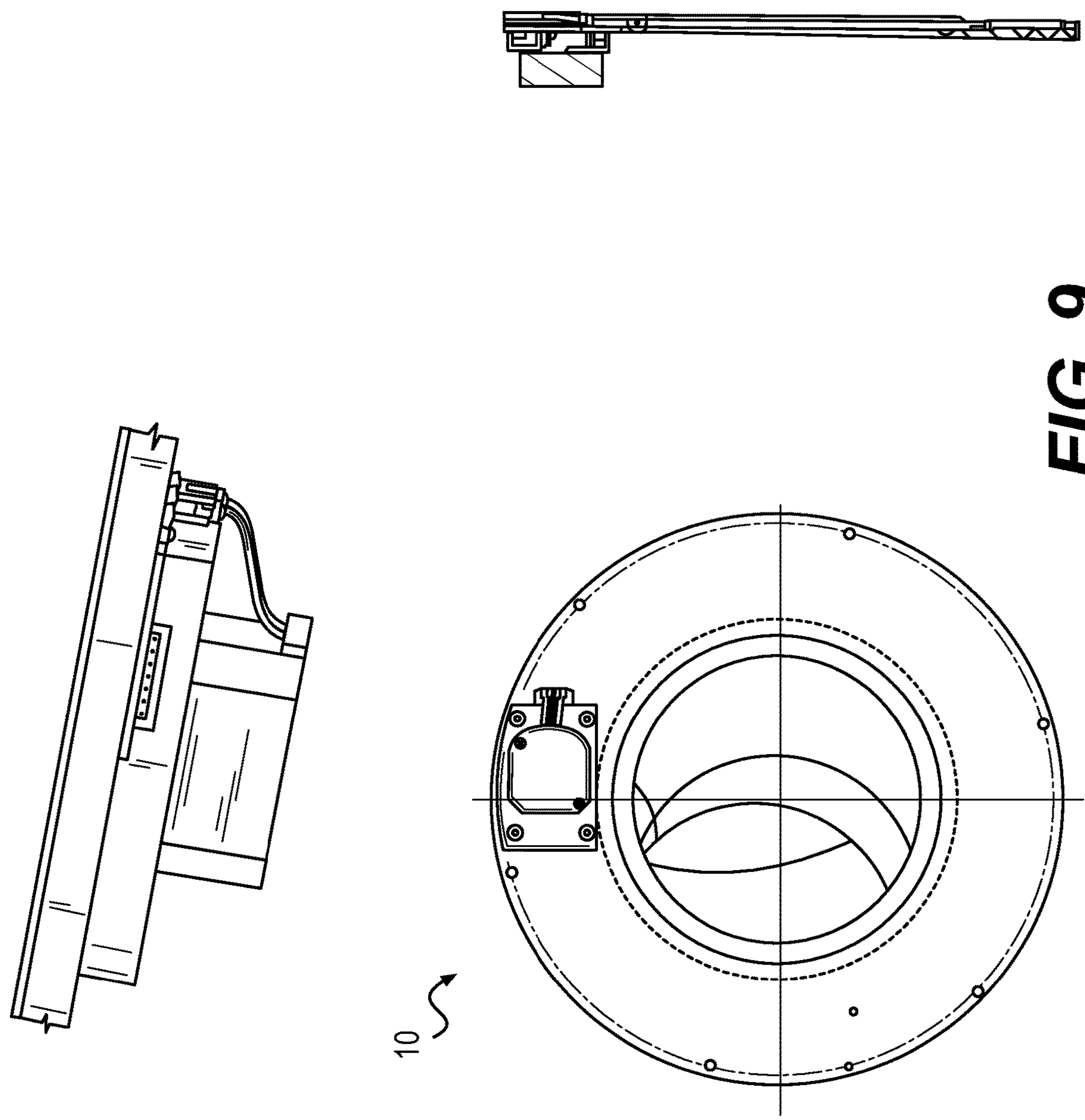
FIG. 9 provides additional views (e.g., a plan view, a partial elevation view, and a cross-sectional view) of the shutter shown in FIGS. 1 and 2.

FIG. 9 illustrates additional plan, partial elevation, and cross-sectional views of the example shutter 10 described herein. Further, the Appendix A of the present application is fully incorporated herein. Appendix A includes various example features, applications, and other parameters associated with an example shutter 10 of the present disclosure. The example information included in Appendix A is for illustration purposes, and the present disclosure is in no way limited to the information included in Appendix A.

As noted above, the various shutters 10 of the present disclosure may be utilized in a variety of different photographic, scientific, calibration, and/or other applications in which relatively rapid opening and closing of the plurality of shutter blades 16 is desired. In such applications, operation of the actuator 30 may be selectively controlled in order to drive rotation of the pinion gear 28, thereby driving commensurate substantially linear movement of the drive rack 26 and transitioning the shutter blades 16 between the open and closed positions. It is understood that the example methods of operating the various shutters 10 disclosed herein shall be applicable to each of the embodiments of the present disclosure.

In an example method of operating a shutter 10, the controller 82 may direct a control signal to the actuator 30 via the printed circuit board 86. For example, the controller 82 may include random-access memory, read-only memory, and/or other like devices or components configured to store algorithms, control programs, control protocols, sensor data, and/or other like information. In such embodiments, the memory of the controller 82 may store one or more sets of instructions that are readable and executable by the controller 82. In such embodiments, the controller 82 may control operation of the shutter 10 based on and/or in response to the instructions stored in the memory thereof. It is also understood that the control signal directed to the actuator 30 by the controller 82 may be a function of such instructions and/or may be generated by the controller 82 based on and/or in response to such instructions.

In an example embodiment, the controller 82 may direct a control signal to the actuator 30 via the printed circuit board 86, and the actuator 30 may rotate the output shaft 41, at a desired rotational speed and/or at a desired acceleration, based at least in part on the control signal. Such rotation may be in a clockwise direction or in a counterclockwise direction. Additionally, the duration and/or extent of such rotation may be controlled based on the corresponding amount of rotation of the shutter blades 16 desired.

Further, it is understood that the extent of rotation, speed, acceleration, and/or other parameters associated with the operation of the actuator 30 may be set and/or calibrated using one or more feedback signals received from at least one of the sensors 90*a*, 90*b* described above. For example, at least one of the sensors 90*a*, 90*b* may detect a first presence/location of a portion of (e.g., a radially outer edge of) at least one of the shutter blades 16 when the shutter blades 16 are in the open position. At least one of the sensors 90*a*, 90*b* may also detect a second presence/location of a portion of (e.g., a radially inner edge of) at least one of the shutter blades 16 when the shutter blades 16 are in the closed position. Control of the actuator 30 (e.g., control of the speed of rotation, acceleration, amount of rotation, direction of rotation, duration of rotation, etc.) may be calibrated and optimized for each individual shutter 10 based at least in part on such information determined by the sensors 90*a*, 90*b*.

Rotation of the output shaft 41 may drive commensurate rotation of the pinion gear 28 attached thereto. Similarly, rotation of the pinion gear 28 may drive substantially linear movement of the drive rack 26. In particular, due to the mating engagement between the teeth 36 of the pinion gear 28 and the teeth 34 of the drive rack 26, rotation of the pinion gear 28 (in, for example, a counterclockwise direction) may drive movement of the drive rack 26 in the first direction 22. Such substantially linear movement of the drive rack 26 may also be governed, restrained, and/or otherwise guided by the engagement between at least part of the drive rack 26 and the channel 32 formed by the base plate 12. Movement of the drive rack 26 may be further governed, restrained, and/or otherwise guided by the engagement between at least part of the drive rack 26 and the retention plate 45. For example, a first surface of the drive rack 26 may slidably engage the channel 32 when the drive rack 26 moves in the first direction 22, and a second surface of the drive rack 26 may slidably engage the retention plate 45 when the drive rack 26 moves in the first direction 22.

Movement of the drive rack 26 in the first direction 22 may drive movement of the shutter blades 16 from, for example, the open position illustrated in FIG. 8 to the closed position illustrated in FIG. 5. For example, the pin 46 of the drive rack 26 may be disposed at least partly within the respective slots 50*a*, 50*b*, 50*c*, 50*d* of each of the shutter blades 16*a*, 16*b*, 16*c*, 16*d*. Additionally, in the example embodiment shown in FIG. 3, the stationary pin 52*a* extending from the inner surface 54 of the base plate 12 may be disposed at least partly within the respective orifices 56*a*, 56*b* of the shutter blades 16*a*, 16*b*. Similarly, the stationary pin 52*b* extending from the inner surface 54 of the base plate 12 may be disposed at least partly within the respective orifices 56*c*, 56*d* of the shutter blades 16*c*, 16*d*. With this configuration, substantially linear movement of the pin 46 (e.g., in the first direction 22) within and relative to the slots 50*a*, 50*b* may cause the shutter blades 16*a*, 16*b* to rotate in a third direction (e.g., a clockwise direction) about the stationary pin 52*a* in order to achieve the closed position of FIG. 5. Additionally, substantially linear movement of the pin 46 (e.g., in the first direction 22) within and relative to the slots 50*c*, 50*d* may cause the shutter blades 16*c*, 16*d* to rotate in a fourth direction (e.g., a counterclockwise direction) opposite the third direction about the stationary pin 52*b* in order to achieve the closed position of FIG. 5. The direction of rotation of the individual shutter blades 16*a*, 16*b*, 16*c*, 16*d* may be governed by the shape, orientation, and/or other configurations of the respective slots 50*a*, 50*b*, 50*c*, 50*d*. The shape, orientation, and/or other configurations of the respective slots 50*a*, 50*b*, 50*c*, 50*d* may also govern the rotational speed, acceleration, deceleration, and/or other travel parameters of the respective shutter blades 16*a*, 16*b*, 16*c*, 16*d*. For example, as noted above, at least one of the shutter blades 16 (e.g., the shutter blade 16*a*) may rotate at a first speed and/or at a first acceleration due to movement of the pin 46 (e.g., in the first direction 22) within the slot 50*a*. However, the same movement of the pin 46 (e.g., in the first direction 22) within the slot 50*b* of the shutter blade 16*b* may cause the shutter blade 16*b* to rotate at a second speed different from the first speed, and/or at a second acceleration different from the first acceleration. In this way, the manner in which the shutter 10 transitions between the open and closed positions may be tailored, at least in part, based on the shape, orientation, and/or other configurations of the slots 50*a*, 50*b*, 50*c*, 50*d*. It is understood that the shape, size, dimensions, and/or other configurations of the respective shutter blades 16*a*, 16*b*, 16*c*, 16*d* may also be tailored to have a corresponding effect on the manner in which the shutter 10 transitions between the open and closed positions.

While the above example is illustrative, at least in part, of movement of the drive rack 26 in the first direction 22 to drive the shutter blades 16 toward the closed position of FIG. 5, in further examples, the shutter 10 may operate in a similar (e.g., an opposite) manner in order to drive the shutter blades 16 toward the open position of FIG. 8. For instance, movement of the drive rack 26 in the second direction 24 may cause rotation of the shutter blades 16 in directions opposite from those described above. In any of the example embodiments described herein, the shutter blade 16*b* may slidably engage the first surface 74 of the guide plate 72 as the shutter 10 transitions between the open and closed positions. Likewise, the shutter blade 16*d* may slidably engage the second surface 76 of the guide plate 72 as the shutter 10 transitions between the open and closed positions. In a similar manner, shutter blade 16*a* may slidably engage the inner surface 54 of the base plate 12 as the shutter 10 transitions between the open and closed positions, and the shutter blade 16*c* may slidably engage the inner surface 78 of the cover 18 as the shutter 10 transitions between the open and closed positions.

It is understood that in various applications, the amount of space allotted for the use of the various shutters described herein may be tightly constrained. Additionally, in manual photographic applications, aerial photographic applications, and/or other like environments, it may be desirable to minimize the overall weight of the shutter 10. While moderate weight reduction may be accomplished by using various lightweight materials to manufacture various components of the shutter 10, more significant weight reduction may be achieved by reducing the overall number of shutter components.

The shutters 10 of the present disclosure may include components and features that overcome one or more of the challenges described above. For instance, in applications requiring a relatively large shutter opening 14 (e.g., a shutter opening 14 having a diameter of at least approximately 100 mm and, in some examples, a shutter opening 14 having a diameter of at least approximately 150 mm), the shutter blade configurations of the present disclosure may minimize the overall footprint of the resulting shutter 10. In particular, the use of two opposing pairs of substantially crescent-shaped shutter blades 16 may minimize the radial travel required of the shutter blades 16 in order to transition the shutter 10 to the fully open position shown in FIG. 8. As a result, the outer diameter of the base plate 12, cover 18, and of the shutter 10, generally, may be minimized. The use of a drive assembly 20 employing a rotating pinion gear 28 to drive substantially linear movement of a drive rack 26 may further assist in reducing the footprint and overall weight of the shutter 10.

Aspects of the present disclosure have been described in detail with particular reference to at least one preferred embodiment, but it will be understood that variations and modifications can be effected within the spirit and scope of the invention. The presently disclosed embodiments are therefore considered in all respects to be illustrative and not restrictive. The scope of the present disclosure is indicated by the appended claims, and all changes that come within the meaning and range of equivalents thereof are intended to be embraced therein.

The invention claimed is:

1. A shutter assembly, comprising:

a base plate defining a shutter opening having a central axis;

a drive assembly coupled to the base plate, the drive assembly including a rotatable pinion gear, and a drive rack mating with the pinion gear and moveable in a substantially linear direction in response to rotation of the pinion gear; and a plurality of shutter blades operably connected to the drive rack, the plurality of shutter blades being configured to rotate between an open position exposing the shutter opening and a closed position substantially occluding the shutter opening in response to movement of the drive rack in the substantially linear direction, at least one shutter blade of the plurality of shutter blades being in contact with the drive rack.

2. The shutter assembly of claim 1, further comprising:

a first pin extending from the base plate; and a second pin extending from the base plate, wherein the plurality of shutter blades includes a first pair of shutter blades rotatable about the first pin, and a second pair of shutter blades rotatable about the second pin.

3. The shutter assembly of claim 2, wherein movement of the drive rack in the substantially linear direction:

drives rotation of the first pair of shutter blades in a first direction about the first pin; and drives rotation of the second pair of shutter blades in a second direction, opposite the first direction, about the second pin.

4. The shutter assembly of claim 3, wherein:

the first pair of shutter blades comprises a first shutter blade and a second shutter blade; and movement of the drive rack in the substantially linear direction drives rotation of the first shutter blade at a first speed, and rotation of the second shutter blade, simultaneous with rotation of the first shutter blade, at a second speed different from the first speed.

5. The shutter assembly of claim 1, wherein each shutter blade of the plurality of shutter blades includes a respective slot, and the drive rack includes a pin extending at least partly through the respective slot of each shutter blade.

6. The shutter assembly of claim 1, further including a substantially planar guide plate disposed opposite the base plate, the plurality of shutter blades including:

a first shutter blade slidably engaging a first surface of the guide plate as the plurality of shutter blades rotates between the open position and the closed position; and a second shutter blade slidably engaging a second surface of the guide plate, opposite the first surface, as the plurality of shutter blades rotates between the open position and the closed position.

7. The shutter assembly of claim 6, wherein the plurality of shutter blades further includes a third shutter blade disposed between the first shutter blade and the base plate, the third shutter blade slidably engaging an inner surface of the base plate, opposite and facing the first surface of the guide plate, as the plurality of shutter blades rotates between the open position and the closed position.

8. The shutter assembly of claim 7, wherein the plurality of shutter blades further includes a fourth shutter blade disposed between the second shutter blade and a cover of the shutter assembly, the fourth shutter blade slidably engaging an inner surface of the cover, opposite and facing the second surface of the guide plate, as the plurality of shutter blades rotates between the open position and the closed position.

9. The shutter assembly of claim 7, wherein the drive rack includes a pin extending through a slot formed by the guide plate, the pin engaging each shutter blade of the plurality of shutter blades.

10. The shutter assembly of claim 1, wherein at least part of the drive rack is slidably disposed within a channel formed by the base plate, the shutter assembly further including a retention plate connected to the base plate, the drive rack being disposed between the base plate and the retention plate.

11. The shutter assembly of claim 1, wherein the drive assembly comprises a stepper motor disposed on a first side of the base plate, the stepper motor including an output shaft configured to drive rotation of the pinion gear, and wherein the drive rack is disposed on a second side of the base plate opposite the first side.

12. The shutter assembly of claim 1, wherein the pinion gear is a first pinion gear, and wherein the shutter assembly further comprises:

a second pinion gear mating with the drive rack;

a first actuator engaged with the first pinion gear and configured to drive rotation of the first pinion gear; and a second actuator engaged with the second pinion gear and configured to drive rotation of the second pinion gear.

13. The shutter assembly of claim 1, wherein each shutter blade of the plurality of shutter blades comprises one or more reinforcement plates coupled thereto, each of the one or more reinforcement plates including a slot mating with a corresponding pin of the drive rack.

14. A method of manufacturing a shutter assembly, the method comprising:

providing a base plate defining a shutter opening having a central axis;

coupling a drive assembly to the base plate, the drive assembly including a rotatable pinion gear;

mating a drive rack with the pinion gear such that the drive rack is moveable in a substantially linear direction in response to rotation of the pinion gear; and connecting a plurality of shutter blades to the drive rack, the plurality of shutter blades being configured to rotate between an open position exposing the shutter opening and a closed position substantially occluding the shutter opening in response to movement of the drive rack in the substantially linear direction, at least one shutter blade of the plurality of shutter blades being in contact with the drive rack.

15. The method of claim 14, further comprising:

coupling one or more reinforcement plates to a corresponding shutter blade of the plurality of shutter blades by mating a slot of a corresponding reinforcement plate of the one or more reinforcement plates with a corresponding pin of the drive rack.

16. The method of claim 14, further comprising:

creating at least one shutter blade of the plurality of shutter blades by coupling a reinforcement frame defining a plurality of opening to at least one blade skin.

17. The method of claim 14, further comprising:

creating at least one shutter blade of the plurality of shutter blades by coupling a reinforcement spine comprising a plurality of legs to the at least one shutter blade.

18. A method of operating a shutter assembly, the method comprising:

driving rotation of a pinion gear of a drive assembly using an actuator of the drive assembly;

in response, at least in part, to driving rotation of the pinion gear, moving a drive rack of the drive assembly engaged with the pinion gear in a substantially linear direction; and in response, at least in part, to moving the drive rack in the substantially linear direction, rotating a plurality of shutter blades operably connected to the drive rack between (i) an open position exposing a shutter opening defined in a base plate coupled to the drive assembly and (ii) a closed position substantially occluding the shutter opening, at least one shutter blade of the plurality of shutter blades being in contact with the drive rack.

19. The method of claim 18, wherein movement of the drive rack in the substantially linear direction results in:

driving rotation of a first pair of shutter blades in a first direction about a first pin extending from the base plate; and driving rotation of a second pair of shutter blades in a second direction, opposite to the first direction, about a second pin extending from the base plate.

20. The method of claim 18, further comprising:

determining if a first stop condition has occurred;

based at least in part on determining that the first stop condition has occurred, discontinuing the driving rotation of the pinion gear of the drive assembly using the actuator of the drive assembly;

based at least in part on determining that the first stop condition has not occurred; determining if a second stop condition has occurred, the second stop condition being different from the first stop condition; and based at least in part on determining that the second stop condition has occurred, discontinuing the driving rotation of the pinion gear of the drive assembly using the actuator of the drive assembly.

* * * * *